United States Patent

[11] 3,577,007

| [72] | Inventor | Anthony L. Cross<br>Arcadia, Calif. |
|---|---|---|
| [21] | Appl. No. | 792,371 |
| [22] | Filed | Jan. 21, 1969 |
| [45] | Patented | May 4, 1971 |
| [73] | Assignee | Bell & Howell Company<br>Chicago, Ill. |

[54] CONSTANT AMPLITUDE VARIABLE FREQUENCY SWEEP GENERATOR
9 Claims, 3 Drawing Figs.

[52] U.S. Cl..................................................... 307/228,
324/15, 328/181, 328/185, 331/183
[51] Int. Cl..................................................... H03k 4/08
[50] Field of Search............................................. 307/228;
328/181, 185; 324/15, 16, 165; 331/182, 183

[56] References Cited
UNITED STATES PATENTS

| 2,854,575 | 9/1958 | Richardson | 328/181 |
| 3,175,161 | 3/1965 | Hackborn et al. | 328/185 |
| 3,217,271 | 11/1965 | Autorino et al. | 328/185X |
| 3,373,377 | 3/1968 | Townsend | 328/185X |

*Primary Examiner*—Stanley D. Miller, Jr.
*Attorney*—Jackson & Jones

ABSTRACT: A sweep generator for an oscilloscope or the like is described for providing a sawtooth output voltage in synchronism with a periodic input signal having a variable repetition rate. A sweep capacitor is discharged in response to the occurrence of each input signal and then charged by a controllable current source to establish a ramp voltage across the capacitor with a selected slope. The voltage across the capacitor is compared with a reference voltage by means of a comparator circuit during a brief time interval at the end of each charging cycle. The comparator circuit controls the magnitude of the current supplied to the sweep capacitor to maintain the peak output voltage substantially constant.

PATENTED MAY 4 1971

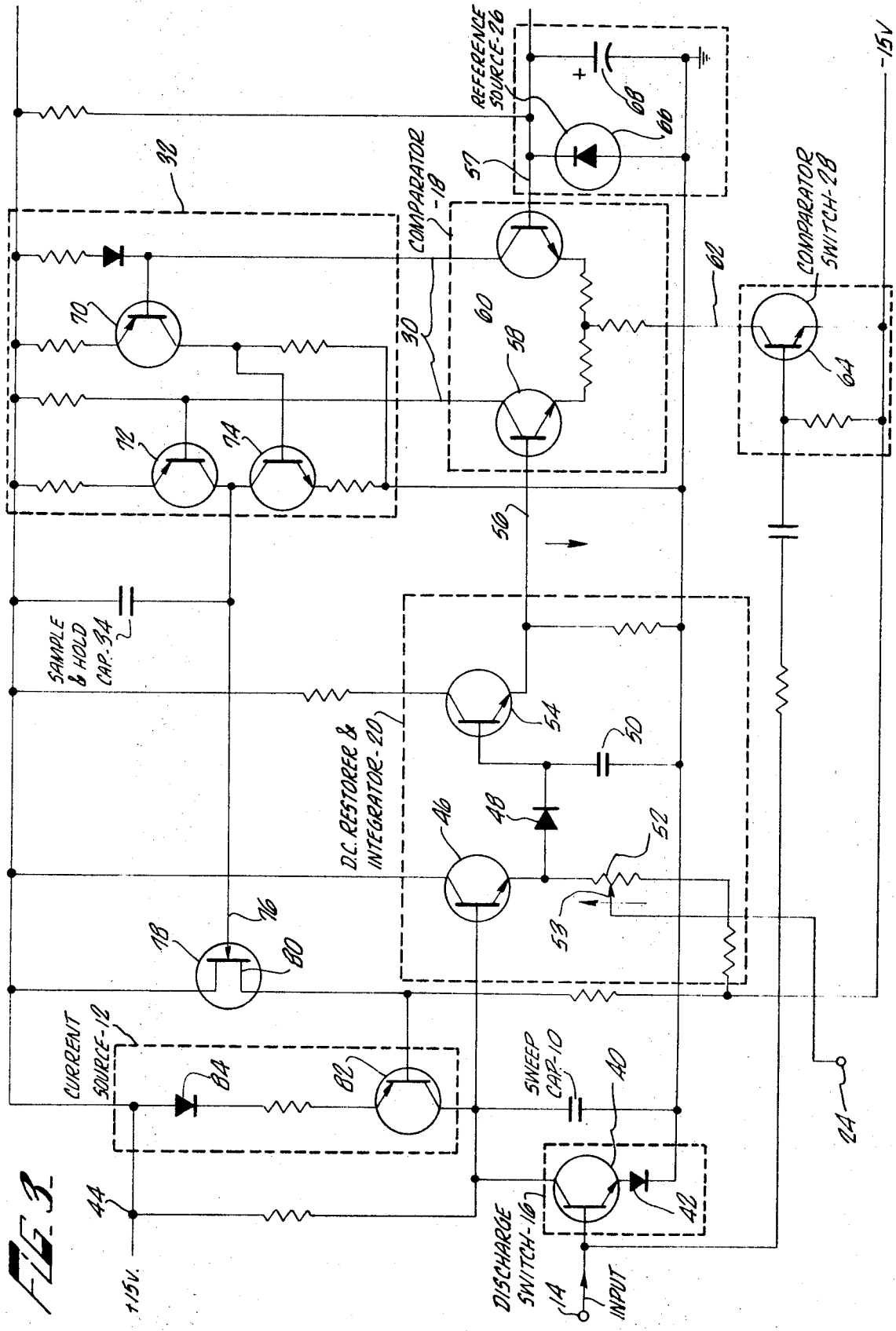

3,577,007

CONSTANT AMPLITUDE VARIABLE FREQUENCY SWEEP GENERATOR

BACKGROUND OF THE INVENTION

1. Field of the Invention

This invention relates to sweep generators and more particularly to sweep generators suitable for generating the sweep voltage for an oscilloscope used to display variable frequency signals such as those indicative of internal combustion engine performance.

2. Description of the Prior Art

Sweep generators for providing a sawtooth output voltage to drive the scanning coils of a cathode ray tube and the like are well known. The ramp voltage produced by such sweep generators may be synchronized with an input signal by providing a ramp voltage having a constant slope or a constant peak. Where it is desired to display the input data on the full oscilloscope screen independently of the frequency, a constant peak ramp voltage is used.

In prior art sweep generators for providing a constant peak ramp voltage a sweep capacitor is charged and discharged in synchronism with the input signal. A controllable current source supplies charge to the sweep capacitor to provide the ramp voltage. The ramp voltage is continuously integrated and compared with a reference voltage and the difference between the integrated sweep voltage and the reference voltage is used to control the current source.

This type of conventional sweep generator has at least one inherent shortcoming. The sweep generator is either limited to a narrow range of input frequencies or is limited to a very slow response time. The integrated sweep voltage contains a ripple signal having a frequency equal to the input signal frequency. The use of a small smoothing capacitor in the integrator circuit provides a fast response time but at a sacrifice in stability where a wide range of input frequencies is used. The use of a large smoothing capacitor in the integrator circuit provides a stable circuit with a slow response time. Such prior art servo sweep generators have been found unsatisfactory for use in an internal combustion engine analyzing system where a fast response time is required and the input signal frequencies may vary over an extended range, i.e. 500 r.p.m. to 4,000 r.p.m. The above disadvantages have been overcome by the present invention.

SUMMARY OF THE INVENTION

In accordance with the present invention, a servo sweep generator for producing a sawtooth output voltage for use in an engine analyzer in response to a periodic input signal includes a first charge storage means such as a sweep capacitor. supplying charge to the sweep capacitor. The sweep capacitor is discharged in response to the occurrence of each input signal by a suitable switching means. Comparing means responsive to the occurrence of each input signal is provided for comparing the voltage across the sweep capacitor with a reference voltage during a brief time interval. Means under the control of the comparing means is coupled to the charge supply means for setting the charge rate and thereby the slope of the output voltage to provide a substantially constant peak output voltage independently of the frequency of the input signal. The use of a short sampling interval (for the sweep capacitor voltage) with respect to the anticipated range of input signal frequencies provides a stable circuit which has fast response time over a wide frequency range.

BRIEF DESCRIPTION OF THE DRAWINGS

FIG. 3 is a schematic circuit diagram of the generator illustrated in FIG. 1.

DESCRIPTION OF THE PREFERRED EMBODIMENT

Figure 1:
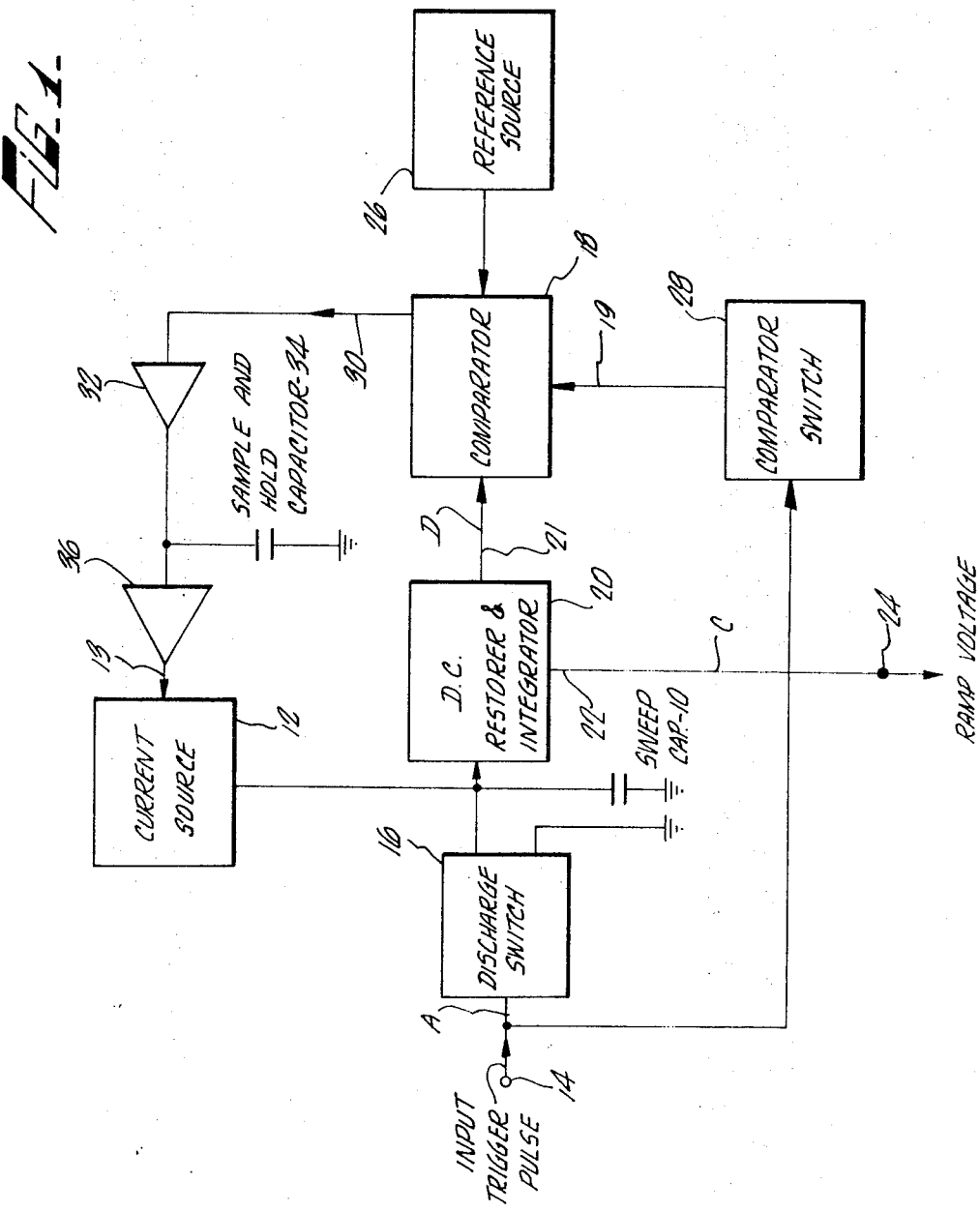
FIG. 1 is a block diagram of a servo sweep generator utilizing the principles of the present invention.
Figure 2:
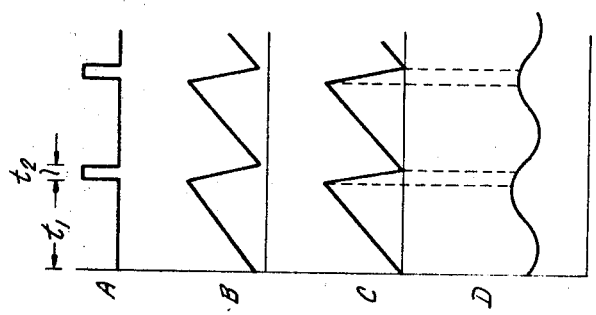
FIG. 2 is a waveform diagram illustrating voltage waveforms taken at selected points in the circuit of FIG. 1.

The servo sweep generator as illustrated in FIG. 1 includes a first charge storage means or sweep capacitor 10. The sweep capacitor 10 is charged by a controllable current source 12, the output current of which determines the slope of the ramp voltage appearing across the capacitor 10. Input trigger signals (curve A, FIG. 2) are applied to an input terminal 14 for actuating a discharge switch 16 to synchronize the sweep generator. The input signals are derived from the cylinder ignition of an internal combustion engine and have a frequency which varies with the engine r.p.m. The time interval $t_1$ in FIG. 2 represents the charging time for the sweep capacitor or the time between input trigger pulses. The time $t_2$ represents the duration of the trigger pulses.

The switch 16 discharges the sweep capacitor 10 in response to the occurrence of each input signal. A small residual voltage remains on the capacitor 10 in its discharged state due to the closed circuit impedance of the discharge switch 16. See curve B in FIG. 2. The ramp voltage appearing across the sweep capacitor is referenced to ground by a DC restorer and integrator 20. The restored ramp voltage (curve C, FIG. 2) is supplied to an output terminal 24 via an output circuit 22 of the DC restorer 20. The DC restorer and integrator 20 includes an additional output circuit 21 which is connected to one input circuit of a comparator or differential amplifier 18. The voltage appearing in output circuit 21 is illustrated by curve D in FIG. 2 and represents the integral of the restored ramp voltage. The integrated ramp voltage appears as a DC voltage level with a superimposed AC ripple voltage having a frequency equal to the frequency of the input signals.

A source of reference voltage 26 is connected to the other input circuit of the comparator 18. The comparator 18 also includes a control circuit 19 which is connected to a comparator switch 28. The comparator switch 28 is in turn connected to the input terminal 14 to activate the comparator 18 in response to the occurrence of each input trigger pulse. During the brief time interval $t_2$, the comparator samples the integrated output voltage appearing across the sweep capacitor 10 and compares the sampled voltage with the reference voltage from source 26. The difference between the reference voltage and the sampled ramp voltage appears across an output circuit 30 of the comparator. The comparator output voltage is amplified by amplifier 32 and supplied to a sample and hold capacitor 34. The output impedance of amplifier 32 is low, thus the charge and discharge time constant of capacitor 34 is of short duration.

The current source 12 includes an input circuit 13 which receives a voltage representative of the charge on the capacitor 34 via an amplifier 36 in a conventional manner. The current supplied to the sweep capacitor is proportional to the voltage across the sample and hold capacitor 34 which in turn represents the magnitude and polarity of the output signal from the comparator 18. If the peak ramp voltage increases above the reference voltage the comparator output reduces the charge on the sample and hold capacitor and vice versa. By sampling the integrated voltage across the sweep capacitor 10 during a very short time interval, e.g. less than 5 percent (and preferably about 1 percent) of the sweep time interval $t_1$ at the highest anticipated input signal frequency, the servo sweep generator is provided with a very fast response time. The use of a short sampling interval also increases the stability of the circuit since only a very small segment of the ripple voltage is sampled and this sample remains constant with respect to the phase of the ripple voltage.

Referring now to FIG. 3, a schematic circuit diagram of the sweep generator is shown. The discharge switch 16 includes a transistor 40 and a diode 42 connected between the positive supply terminal 44 and ground. The base of the transistor 40 is connected to the input terminal 14 so that the application of a positive going input pulse (curve A, FIG. 2) turns the transistor 40 on and discharges the sweep capacitor 10. The impedance of the transistor 40 and the diode 42 in the conducting state provide a sweep voltage as shown in curve B of FIG. 2 which does not drop to zero or ground potential but remains above ground potential a fraction of a volt. The DC restorer and integrator 20 includes a transistor 46 connected in an emitter follower configuration with the emitter thereof connected through a diode 48 to an integrating capacitor 50. The output terminal 24 of the sweep generator is connected to a variable tap of a potentiometer 52 which provides the emitter resistance for the transistor 46. The tap 53 of the potentiometer is adjusted to provide the proper DC level for the generated sawtooth waveform.

A transistor 54 couples the output voltage appearing across the capacitor 50 to one input circuit 56 of the comparator 18. The comparator 18 is illustrated as a differential amplifier which includes a pair of transistors 58 and 60. The reference source 26 includes a Zener diode 66 and a smoothing capacitor 68 which are connected to the second input 57 of the comparator 18.

A comparator switching transistor 64 is connected to the common emitter resistor 62 for the transistors 58 and 60. The transistor 64 is rendered conducting by the input trigger pulses (A, FIG. 2) and actuates the comparator 18 by turning on the transistors 58 and 60. At this time the voltage across the capacitor 50 is compared with the reference voltage established across the Zener diode 66. The difference voltage appears in the comparator output circuit 30 and is applied to the input of the amplifier 32 which consists of three transistors 70, 72 and 74. The voltage appearing in the output circuit 30 will either be positive or negative depending upon whether the voltage across the capacitor 50 is above or below the reference voltage. This difference voltage is amplified by the amplifier 32 and supplied to the sample and hold capacitor 34 to increase or decrease the charge on the capacitor 34.

The voltage across the sample and hold capacitor 34 is applied to a control electrode 76 of a field effect transistor 78. The source electrode 80 of the field effect transistor is connected to the base of a transistor 82 which is included in a current source 12. A diode 84 is connected between the positive supply terminal 44 and the emitter of the transistor 82. The transistor 82 functions as a current source with the magnitude of the current controlled by the magnitude of the voltage on the source electrode 80 of the field effect transistor 78. The voltage on the source electrode 80 of the transistor 78 is in turn controlled by the voltage appearing across the sample and hold capacitor 34.

In operation, a decrease in the peak amplitude of the ramp voltage lowers the voltage on the base of the comparator transistor 58. This lowers the voltage on the collector of the transistor 60 during the time it is rendered conducting via the switching transistor 64. The lowered voltage on the collector of the transistor 60 lowers the voltage on the base of the transistor 70. This increases the conduction of the transistors 70 and 74 and increases the charge on the sample and hold capacitor 34. The voltage across the capacitor 34 is thereby raised which lowers the voltage on the source electrode 80 of the field effect transistor 76. The conduction of the current source transistor 82 is increased to supply more current to the sweep capacitor 10 and raise the amplitude of the ramp voltage. When the peak ramp voltage exceeds the reference voltage, the conduction of the transistor 70 is decreased, and transistor 72 is turned on thereby discharging the sample and hold capacitor and reducing the current supplied to the sweep capacitor.

A servo sweep generator having a fast response time over a wide range of input signal frequencies has been described. Various modifications to the preferred embodiment described above will be apparent to those skilled in the art without involving any departure from the spirit and scope of the invention.

I claim:

1. In a servo sweep generator for producing a sawtooth output voltage in synchronism with an input signal derived from the cylinder ignition of an internal combustion engine, the combination which comprises:

first charge storage means,
   charge supply means for supplying charge to the first charge storage means at a selected rate,
   means responsive to the occurrence of each input signal for discharging the charge storage means,
   a source of reference voltage,
   comparing means responsive to the occurrence of each input signal for comparing the voltage across the first charge storage means with the reference voltage during a predetermined time interval, said predetermined time interval being small as compared to the time interval between successive input signals, and
   means under the control of the comparing means for setting the rate of the charge supply means.

2. The combination as defined in claim 1 wherein the comparing means includes:

a comparator having a pair of input circuits, an output circuit and a control circuit, the comparator being arranged to provide an output signal on the output circuit thereof which is representative of the difference in the magnitude of the input signals applied to the input circuits thereof in response to the application of a control signal to the control circuit, and
   integrating means connected between the first charge storage means and one input circuit of the comparator, the other input circuit of the comparator being connected to the source of reference voltage, the output circuit being coupled to the charge supply means and
   means responsive to the occurrence of the input signal for supplying a control signal to the control circuit of the comparator.

3. The combination as defined in claim 1 wherein the means for setting the rate of the charge supply means includes second charge storage means coupled to the output circuit of the comparator.

4. The combination as defined in claim 3 wherein the predetermined time interval is less than five percent of the time interval between input signals.

5. The combination as defined in claim 4 including a field effect transistor connected between the second charge storage means and the charge supply means.

6. In a servo sweep generator for producing an output voltage in response to a periodic input signal derived from the cylinder ignition of an internal combustion engine, the combination which comprises:

a sweep capacitor,
   a current source connected to the sweep capacitor, the current source including an input circuit and being arranged to supply charge to the sweep capacitor at a rate which is proportional to the amplitude of a signal applied to the input circuit thereof,
   a discharge switch connected across the sweep capacitor and responsive to the occurrence of each input signal for discharging the sweep capacitor,
   a comparator having a pair of input circuits, an output circuit and a control circuit, the comparator being arranged to provide an output signal on the output circuit thereof which is representative of the difference between the signals applied to the input circuits in response to the application of a control signal to the control circuit thereof,
   direct current restoring and integrating means coupled between one input circuit of the comparator and the sweep capacitor,
   a source of reference voltage connected to the other input circuit of the comparator,
   switching means responsive to the occurrence of each input signal for applying a control signal of predetermined duration to the control circuit of the comparator,
   a sample and hold capacitor, amplifying means connected between the output circuit of the comparator and the sample and hold capacitor to establish charge across the sample and hold capacitor which is proportional to the output signal from the comparator, and means for coupling a signal proportional to the voltage across the sample and hold capacitor to the input circuit of the current source.

7. The combination as defined in claim 6 wherein the last named means includes a field effect transistor.

8. The combination as defined in claim 6 wherein the comparator is a differential amplifier.

9. The combination as defined in claim 6 wherein the time duration of the control signals is less than five percent of the charging time interval of the sweep capacitor.

UNITED STATES PATENT OFFICE
CERTIFICATE OF CORRECTION

Patent No. 3,577,007                    Dated May 4, 1971

Inventor(s) Anthony L. Cross

It is certified that error appears in the above-identified patent and that said Letters Patent are hereby corrected as shown below:

Column 1, line 52, insert after "a sweep capacitor."—"Charge supply means such as a controllable current source is provided for"---

Signed and sealed this 23rd day of November 1971.

(SEAL)
Attest:

EDWARD M. FLETCHER, JR.             ROBERT GOTTSCHALK
Attesting Officer                    Acting Commissioner of P